Dec. 15, 1942.  O. E. SWANSON  2,305,117
FISH LURE
Filed Feb. 28, 1941

INVENTOR.
O. Edwin Swanson
BY John A. Bemmhardt

Patented Dec. 15, 1942

2,305,117

UNITED STATES PATENT OFFICE 2,305,117

FISH LURE

Oscar Edwin Swanson, Elyria, Ohio

Application February 28, 1941, Serial No. 381,103

6 Claims. (Cl. 43—45)

This invention relates to fish lures and more particularly to the trolling spinner, artificial bait type lure.

The main object of the invention is to provide an improved spinning lure, which, because of its particular construction, will spin rapidly and easily, even at low trolling speeds, and which will be durable and serviceable.

The invention is illustrated in the accompanying drawing in which.

Figure 2:
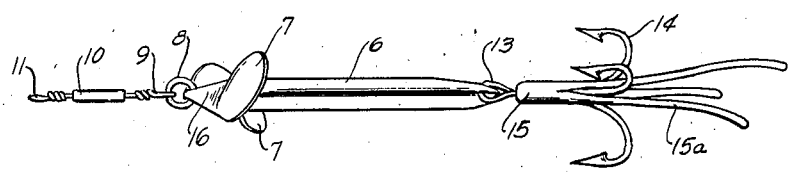
Fig. 2 is a side elevation of the same.
Figure 1:
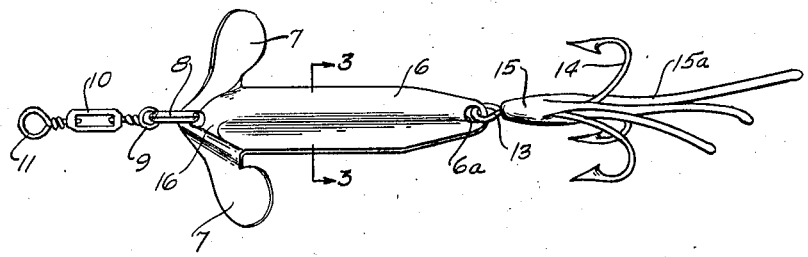
Fig. 1 is a plan view of the lure.
Figures 3, 4:
Fig. 3 is a cross section on the line 3—3 of Fig. 1.
Fig. 4 is a cross section of a modified form wherein the body of the lure is made in the form of a Z in cross section.

Referring to the drawing in which like numerals indicate similar parts 6 indicates the main body of the lure which is made of pressed sheet metal or like other substance, said body 6 having at its front end ears 7 which are set at opposite angles with respect to each other and thereby causes the lure to revolve when pulled through the water. The body 6 is stamped to take the form of an S in cross section as shown in Fig. 3 or in the form of a Z as shown in Fig. 4. It has been found that with the body stamped in either of these forms it greatly reduces the water resistance of the body to the centrifugal or rotary motion imparted thereto by the ears and further to add strength to the body. The head end of the body 6 has attached thereto a ring 8 to which is fastened one end 9 of a swivel 10, the other end 11 being attached to a fish line or the like (not shown). To the rear or tail of the body is attached the shank 13 of a fish hook 14, there being three pronged members in the form shown, but the number of hooks of course being immaterial to the operation of the device.

A tubular rubber member 15 is slipped over the shank 13 of the hook before the same is attached to the tail of the body, and the rear part is split at several places to form trailing fingers. Feathers or the like may be substituted for the rubber member 15.

The head or front end of the body 6 of the lure is bent at an angle as indicated at 16 and converges at respective sides into the oppositely bent ears 7 which thereby helps to make the whole lure spin or whirl axially when drawn through the water.

I have therefore provided a durable and serviceable lure, the head, ears and body all being stamped from a single piece of metal, while part of the head and all of the body is channel formed lengthwise providing less water resistance while the lure is spinning and in addition adding considerable strength to the metal body.

I claim:

1. A fish lure of the spinning type comprising a body and head portions, said portions being Z-shaped in cross section, oppositely bent ears extending laterally from the edge of the body, the head portion at each side being bent at an angle with respect to the body and converging into the bent ears.

2. A fish lure of the spinning type comprising an elongated body portion, propelling devices projecting laterally and inclining rearwardly and extending from the forward end of the body portion on opposite sides thereof and having ears at their ends disposed at opposite angles with respect to each other for rotating the lure as it is drawn through the water, said body portion being symmetrically channeled about the longitudinal axis of the lure and the greater portions of said ears lying rearwardly of the foremost channeled portion of the body portion.

3. A fish lure of the spinning type comprising an elongated body portion of substantial uniform cross-section, propeller blades formed on one end of said body portion, said blades projecting laterally and inclining rearwardly and extending from the forward end of the body portion on opposite sides thereof and having ears at their ends disposed at opposite angles with respect to each other, said body portion being symmetrically channeled about the longitudinal axis of the lure whereby said body portion is caused to move in substantially a straight line in its spinning movement through the water.

4. A fish lure of the spinning type comprising an elongated body portion, propelling devices projecting laterally and inclining rearwardly and extending from the forward end of the body portion on opposite sides thereof and having ears at their ends disposed at opposite angles with respect to each other for rotating the lure as it is drawn through the water, said body portion being symmetrically channeled about its longitudinal axis, the greater portions of said ears lying rearwardly of the foremost cross-sectional plane of the channel formation of the body portion, a hook attached to the trailing end of the body portion, and a tubular member fitted over the shank of the hook and split at one end to form trailing fingers.

5. A fish lure of the spinning type comprising an elongated body portion, propelling devices projecting laterally and inclining rearwardly and extending from the forward end of the body portion on opposite sides thereof and having ears at their ends disposed at opposite angles with respect to each other for rotating the lure as it is drawn through the water, said body portion being of ogee form in cross-section throughout substantially its longitudinal extent, the greater portion of said ears lying rearwardly of the foremost cross-sectional plane of the ogee formation of the body portion, a hook secured to the trailing end of said body portion, and a tubular member fitted over the shank of the hook and split at its rear to form trailing fingers.

6. A fish lure of the spinning type, comprising a one-piece member having a cross section of ogee form from a plane near the front portion thereof to a point at the rear thereof, there being eyes in the longitudinal axis of the member, propelling devices projecting laterally and inclining rearwardly and extending from the front eye on opposite sides of the member and having ears at their ends disposed at opposite angles with respect to each other, the greater portions of said ears lying rearwardly of the foremost cross sectional plane of the ogee formation of the member, the ogee formation being of continuous form for the greater portion of the extent of the member and of lesser curvature for the portion at the rear end of the member.

O. EDWIN SWANSON.